(12) United States Patent
Reinards et al.

(10) Patent No.: US 10,814,722 B2
(45) Date of Patent: Oct. 27, 2020

(54) METHOD FOR THE POWER REQUIREMENT-DEPENDENT OPERATION OF A GENERATOR UNIT

(71) Applicant: Deere & Company, Moline, IL (US)

(72) Inventors: Marco Reinards, Grünstadt (DE); Barbara Böhm, Heidelberg (DE); Norbert Fritz, Ilvesheim (DE)

(73) Assignee: DEERE & COMPANY, Moline, IL (US)

( * ) Notice: Subject to any disclaimer, the term of this patent is extended or adjusted under 35 U.S.C. 154(b) by 254 days.

(21) Appl. No.: 15/233,537

(22) Filed: Aug. 10, 2016

(65) Prior Publication Data
US 2016/0347172 A1 Dec. 1, 2016

Related U.S. Application Data

(63) Continuation of application No. PCT/EP2015/052550, filed on Feb. 6, 2015.

(30) Foreign Application Priority Data

Feb. 11, 2014 (DE) ........................ 10 2014 202 449

(51) Int. Cl.
*B60K 25/06* (2006.01)
*B60K 25/00* (2006.01)

(52) U.S. Cl.
CPC .............. *B60K 25/06* (2013.01); *B60K 25/00* (2013.01); *B60Y 2200/221* (2013.01)

(58) Field of Classification Search
CPC ... B60K 25/06; B60K 25/00; B60Y 2200/221
USPC .............................. 307/91, 9.1; 324/503, 538
See application file for complete search history.

(56) References Cited

U.S. PATENT DOCUMENTS

| 2009/0305519 A1* | 12/2009 | Tarasinski | ................ B60D 1/62 439/35 |
| 2011/0204712 A1* | 8/2011 | Tarasinski | .............. A01B 59/06 307/9.1 |
| 2015/0367728 A1* | 12/2015 | Neumann | .............. B60K 25/02 74/15.6 |

FOREIGN PATENT DOCUMENTS

| DE | 10303050 B4 | 5/2006 |
| DE | 102005019362 A1 | 11/2006 |
| DE | 102009038243 A1 | 2/2011 |
| DE | 102009043591 A1 | 3/2011 |
| DE | 102010010041 A1 | 9/2011 |
| DE | 102012006731 A1 | 10/2013 |
| EP | 1666996 B1 | 8/2013 |

OTHER PUBLICATIONS

German Search Report issued in counterpart application No. 102014202449.8, dated Dec. 12, 2014, (10 pages).

(Continued)

*Primary Examiner* — Rexford N Barnie
*Assistant Examiner* — Toan T Vu
(74) *Attorney, Agent, or Firm* — Taft Stettinius & Hollister LLP; Stephen F. Rost

(57) ABSTRACT

A method is provided for the power requirement-dependent operation of a generator unit mounted on an agricultural work vehicle. A power output of the generator unit is varied as a function of a determined power requirement of an electrical consumer, which is fed with the power of the generator unit of an attachment which is connected to the agricultural work vehicle.

12 Claims, 3 Drawing Sheets

(56) References Cited

OTHER PUBLICATIONS

The International Search Report and the Written Opinion of the International Searching Authority issued in counterpart application No. PCT/EP2015/052550, dated Sep. 11, 2015, (4 pages).

* cited by examiner

METHOD FOR THE POWER REQUIREMENT-DEPENDENT OPERATION OF A GENERATOR UNIT

RELATED APPLICATION

This application is a continuation application of International Application Serial No. PCT/EP2015/052550, which has an international filing date of Feb. 6, 2015, and which claims the benefit of German Application Ser. No. 102014202449.8, filed on Feb. 11, 2014. The disclosures of these aforementioned applications are hereby expressly incorporated by reference in their entirety.

FIELD OF THE DISCLOSURE

The present disclosure relates to a generator unit, and in particular to a method for a power requirement-dependent operation of a generator unit mounted on an agricultural work vehicle.

BACKGROUND

In the agricultural industry, a convention generator unit for an agricultural work vehicle is removably connected to the work vehicle and includes an electric generator with a rotor and a stator. The rotor can be connected at least indirectly to the power takeoff shaft of the work vehicle in order to provide drive. As a result, electrical consumers of an attachment which is coupled to the work vehicle can be operated with a higher rated voltage than is usually made available by the on-board power system of the work vehicle.

In such an arrangement, the power output of the electric generator is proportional to the rotational speed with which the electric generator is driven. In the case of a generator unit which is driven via the power takeoff shaft, this rotational speed of the generator is proportional to the rotational speed of the power takeoff shaft, and the rotational speed of the power takeoff shaft is in turn directly dependent on the rotational speed of the internal combustion engine of the agricultural work vehicle. Ultimately, the power output of the electric generator is dependent on the rotational speed of the internal combustion engine, and a change in the power output of the electric generator can be brought about only by changing the rotational speed of the internal combustion engine.

In an electrical consumer of an attachment which is coupled to the work vehicle, a power requirement then comes about during operation. The power requirement can vary as a function of the load acting on the attachment, of the operating states, or of the size of the attachment. So that the attachment ensures optimum operation, the generator unit can cover the power requirement of the attachment at all times. In order to cover the power demand of the attachment, in the arrangement described above the operator of the work vehicle must check the power output of the electric generator by means of the rotational speed of the internal combustion engine and adapt it where necessary. This requires a large degree of attentiveness on the part of the operator. In some instances due to an excessively low rotational speed of the internal combustion engine, the power output of the generator unit is not able to cover the power demand of the attachment or that, owing to a high rotational speed of the internal combustion engine, the power demand of the attachment is covered but an uneconomically high rotational speed level is present.

SUMMARY

In this disclosure, a method is provided for the power requirement-dependent operation of a generator unit mounted on an agricultural work vehicle. In this method, a power output of the generator unit is varied as a function of a determined power requirement of an electrical consumer, which is fed with the power of the generator unit of an attachment which is connected to the agricultural work vehicle.

The term "a mounted generator unit" is to be understood as meaning that the generator unit is either attached in a removable fashion to the front or rear three-point suspension of the work machine or is permanently connected to the work machine at a location at which a rotational movement can be transmitted from the work machine to the generator unit. The generator unit includes a transmission and an electric generator which has a drive connection to the transmission. By means of the transmission it is possible to make available a transmission ratio between the power takeoff shaft which drives the transmission and the electric generator. The attachment can be, for example, a manure spreader, a field sprayer or a loading wagon. Other attachments may also be used within the teachings and principles of this disclosure. Furthermore, it is possible to provide that the electrical consumer of the attachment makes available the drive in order to discharge the material which is to be distributed, for example, on an electrically driven pump or a drive of the attachment per se, such as an electric motor on the drive axle.

In one embodiment, a method is provided such that, during the operation of an electrified implement by a generator unit which can be driven by an internal combustion engine of the work machine, sufficient power is made available to the attachment in every operating state, but at the same time the power output of the generator unit is limited to the power demand of the attachment.

The power output of the generator unit is varied by adapting an input rotational speed of the generator unit. As a result it is possible to limit the power output of the generator unit by adapting the rotational speed of the internal combustion engine to the power demand of the attachment. Economical operation of the internal combustion engine is therefore ensured.

The power requirement is determined the attachment. In this way, the power requirement is determined at the point at which it arises.

The determined power requirement of the attachment is transmitted as a power demand at least indirectly to the generator unit. This ensures that the generator unit can make a comparison between the transmitted power demand and the instantaneous power output.

The power demand is transmitted to the generator unit indirectly via the agricultural work machine. In this way, the connection which is present in any case for the transmission, via the AEF interface between the attachment and the work machine, can be used.

The generator unit transmits a rotational speed request to the agricultural work vehicle as a function of the power requirement of the attachment. This ensures that the generator unit is responsible for the connection element between the attachment and the work vehicle, and for adaptation of the rotational speed of the work vehicle.

The agricultural work vehicle converts the rotational speed request into adaptation of the rotational speed of the engine or the rotational speed of the power takeoff shaft. As a result, the operator is relieved of the need to correct the rotational speed of the engine or the rotational speed of the power takeoff shaft.

A control unit is provided which meets the power requirement of the attachment, the power output of the generator unit and the rotational speed of the engine or of the power takeoff shaft to form a closed-loop control circuit in which closed-loop control is carried out to the effect that the power output of the generator unit corresponds at least approximately to the power requirement of the attachment.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
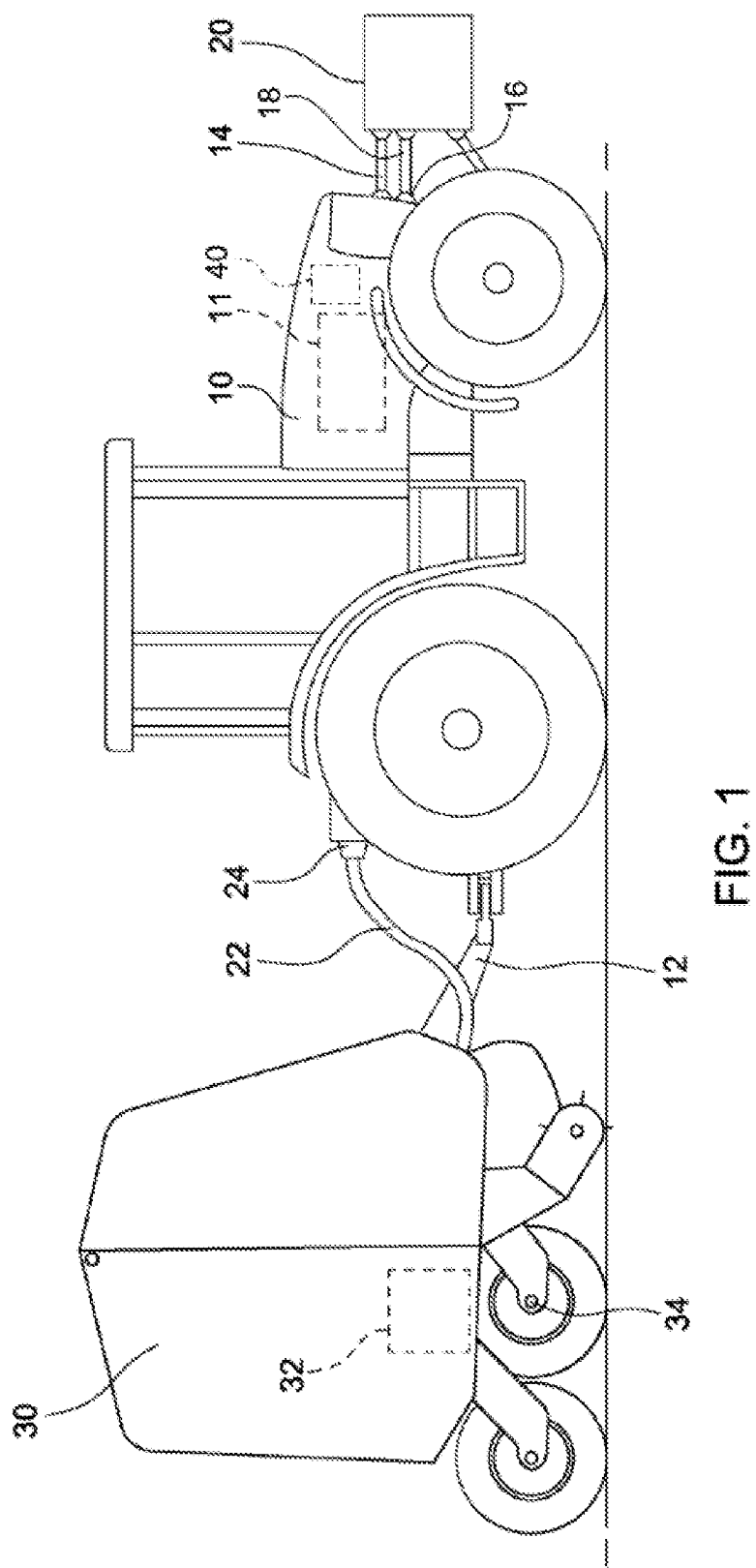
FIG. 1 is a side view an agricultural work vehicle with a coupled implement and generator unit.

FIG. 1 shows an agricultural work vehicle 10 in the form of a tractor which tows an attachment 30 in the form of a loading wagon via a coupled drawbar 12. The work vehicle 10 is driven by an internal combustion engine 11 or any other type of engine. The generator unit 20 is mounted on the work vehicle 10 via a front three-point suspension 14. The generator unit 20 is connected to a front power takeoff shaft 16 of the work vehicle 10 via an articulated shaft 18. The generator unit 20 can be driven by rotation of the power takeoff shaft 16 in order to generate electrical power independently of the on-board power system of the work vehicle 10. The attachment 30 is also connected via an electrical conductor 22 and an AEF connector 24 to the work vehicle 10. Electrical power, which is generated by the generator unit 20, can be made available to an electrical consumer 32 of the attachment 30 via conduction means (illustrated in more detail) on the work vehicle 10 via the AEF connector 24 and the electrical conductor 22. The electrical consumer 32 is embodied here as an electric motor for driving an axle 34 of the attachment 30.

It is to be noted that the attachment 30 can be a device which is carried, for example, in the form of a manure spreader. The electrical consumer 32 does not necessarily have to drive an axle either. The drive can also be provided, for example, by means of a pump. In addition, it is possible to provide that the generator unit 20 is attached via a rear three-point suspension and can be driven via a rear-mounted power takeoff shaft of the work vehicle 10. These alternatives are not illustrated.

Figure 2:
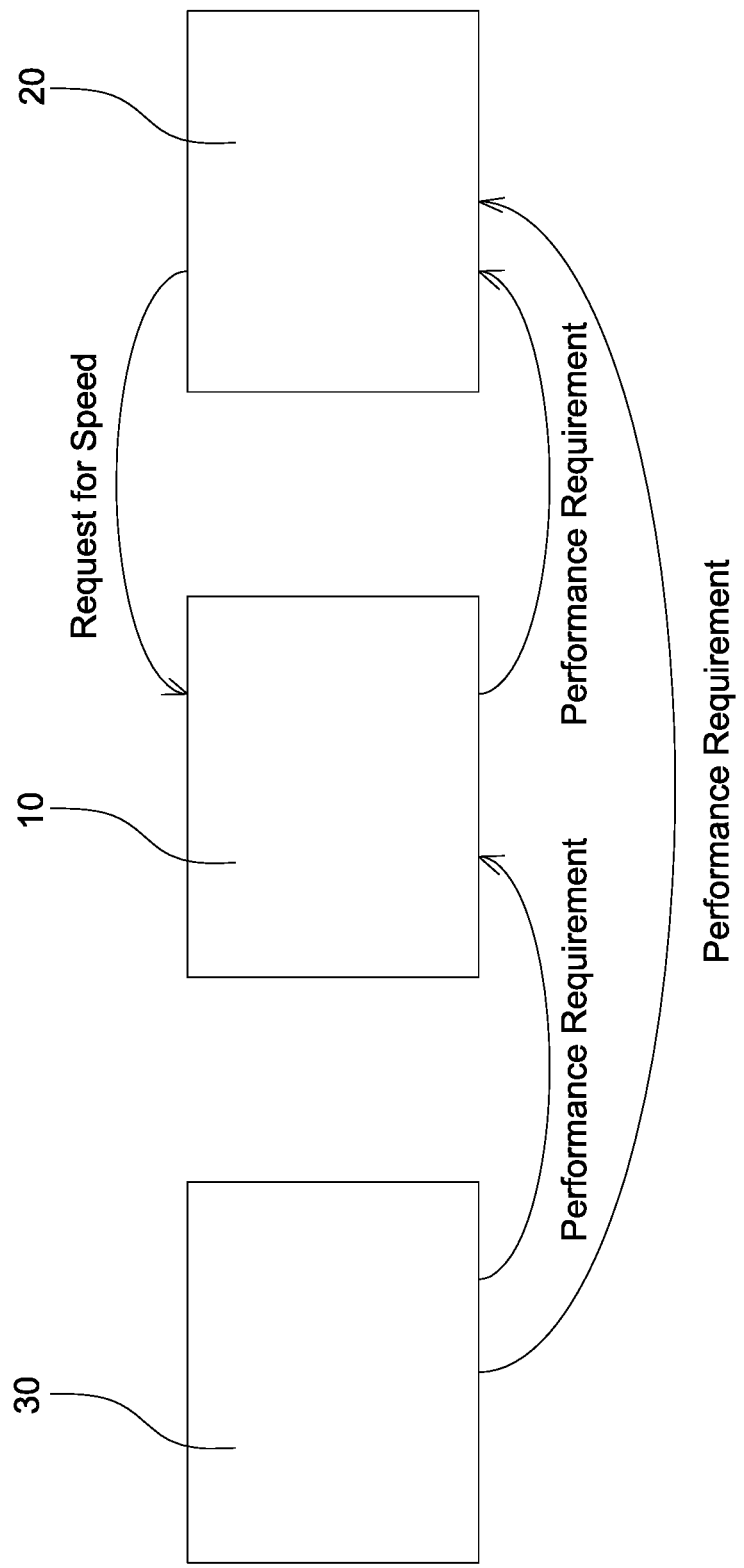
FIG. 2 is a schematic illustration of a work vehicle, of a generator unit and of an attachment, and a communication structure.

In FIG. 2, the work vehicle 10, the generator unit 20, the attachment 30, and a communication structure are shown. It is to be noted that based on the operating state in which the attachment 30 is in a specific point in time, a defined electrical power requirement is produced. In this disclosure, there is provision that the power requirement which is produced as a power demand is either transmitted indirectly via the work vehicle 10 to the generator unit 20 or directly to the generator unit 20. After the generator unit 20 has received the power demand of the attachment 30, the generator unit 20 compares the power demand with the instantaneously available power output. In one example, the power demand and power output correspond with the result that the power output does not have to be adapted. If the power output differs from the power demand, the generator unit 20 transmits a rotational speed request to the work vehicle 10. The rotation speed request is either a request to increase the rotational speed, specifically if the power output is below the power demand, or a request to reduce the rotational speed, specifically if the power output is above the power demand. Furthermore, the rotational speed request can relate to the rotational speed of the internal combustion engine of the work vehicle 10, or alternatively, the rotational speed request can relate to the rotational speed of the power takeoff shaft 16 of the work vehicle 10.

Figure 3:
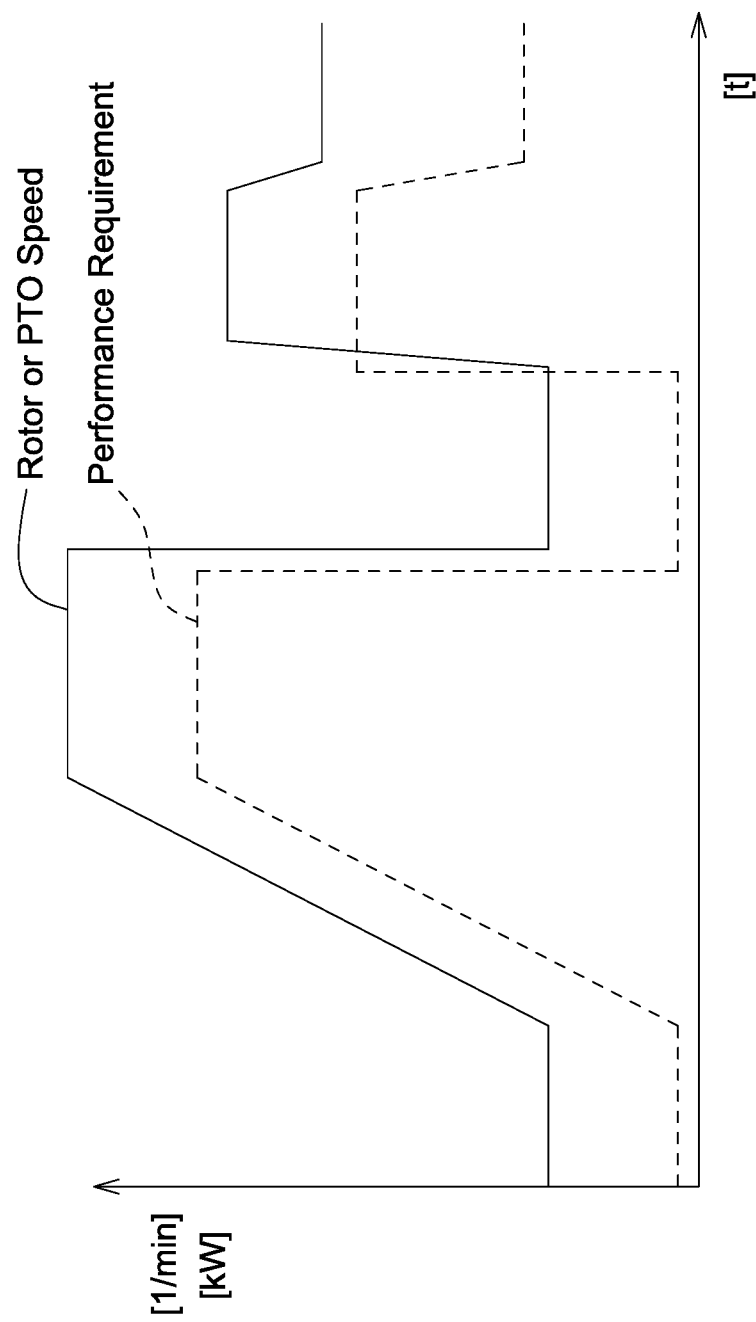
FIG. 3 is a view of time profiles of the power demand and of the rotational speed level.

FIG. 3 further illustrates time profiles of the power demand in the unit of kilowatts (kW) of the attachment 10 and the time profiles of the rotational speed (1/min) of the engine or the rotational speed (1/min) of the power takeoff shaft of the work vehicle 10. In the case of the profile of the power demand of the attachment 10, it is assumed that any change in the curve profile is caused by a change in an operating state of the attachment 10, whatever the cause of said change. As a result, the communication described in relation to FIG. 3 takes place with a change in the rotational speed level according to the requirement. It is to be noted that the respective change in the rotational speed level chronologically tracks the power demand. Expressed in a formula, the relationship illustrated in FIG. 3 is $$f(\text{rotational speed of engine}) = f(\text{power demand}), \text{ if adjustment is carried out to the rotational speed of the engine}$$

or $$f(\text{rotational speed of the power takeoff shaft}) = f(\text{power demand}), \text{ if adjustment is carried out to the rotational speed of the power takeoff shaft.}$$

As illustrated in FIG. 1, a control unit 40 is provided which meets the power requirement of the attachment 30, the power output of the generator unit 20, and the rotational speed of the engine or of the power takeoff shaft 16. This forms a closed-loop control circuit in which closed-loop control is carried out to the effect that the power output of the generator unit 20 corresponds at least approximately to the power requirement of the attachment 30.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for power requirement-dependent operation of an agricultural work vehicle, comprising:
externally mounting a generator unit to the vehicle;
providing an attachment connected to the vehicle and an electrical consumer;
determining a power requirement of the electrical consumer;
comparing the power requirement of the electrical consumer with an available power output;

when the power requirement of the electrical consumer is different from the available power output, then:
varying a power output of the generator unit as a function of the difference between the power requirement of the electrical consumer and the available power output; and
adjusting an input rotational speed of the generator unit to vary the power output of the generator unit to reduce the difference between the power requirement of the electrical consumer and the available power output;
transmitting a rotational speed request from the generator unit to the agricultural work vehicle as a function of the power requirement of the electrical consumer; and
wherein the agricultural work vehicle includes a power takeoff shaft having a rotational speed; and the method further comprises:
converting the rotational speed request into an adaptation of the rotational speed of the power takeoff shaft; and
adapting the rotational speed of the power takeoff shaft to adapt the input rotational speed of the generator unit to vary the power output of the generator unit.

2. The method of claim 1, further comprising determining a power requirement of the attachment.

3. The method of claim 1, wherein the determined power requirement of the electrical consumer is transmitted as a power demand at least indirectly to the generator unit.

4. The method of claim 3, wherein the power demand is transmitted to the generator unit via the agricultural work vehicle.

5. The method of claim 1, wherein the agricultural work vehicle includes at least one of an engine having a rotational speed and a power takeoff shaft having a rotational speed; and the method further comprising:
providing a control unit;
linking by the control unit the power requirement of the electrical consumer, the power output of the generator unit, and the rotational speed of the engine or of the power takeoff shaft; and
forming a closed-loop control circuit in which closed-loop control is carried out in such a way that the power output of the generator unit corresponds at least approximately to the power requirement of the electrical consumer.

6. The method of claim 1, wherein the agricultural work vehicle includes an engine having a rotational speed; and the method further comprises: converting the rotational speed request into an adaptation of the rotational speed of the engine; and adapting the rotational speed of the engine to adapt the input rotational speed of the generator unit to vary the power output of the generator unit.

7. The method of claim 1, further comprising:
coupling the generator unit to the vehicle using a power takeoff shaft having a rotational speed; and
wherein adapting an input rotational speed of the generator unit to vary the power output of the generator unit comprises adapting the rotational speed of the power takeoff shaft.

8. The method of claim 1, wherein the generator unit is externally mounted to the front of the vehicle.

9. A method for power requirement-dependent operation of an agricultural work vehicle, comprising:
externally mounting a generator unit on the vehicle;
coupling the generator unit to the vehicle using a power takeoff shaft having a rotational speed;
providing an attachment connected to the vehicle and an electrical consumer;
producing a power requirement of the electrical consumer;
transmitting the power requirement of the electrical consumer to the generator unit;
comparing the power requirement of the electrical consumer to an available power output;
when the power requirement of the electrical consumer is different from the available power output, then:
transmitting a rotational speed request from the generator unit to the vehicle, where the rotational speed request is a function of the power requirement of the electrical consumer;
adjusting the rotational speed of the power takeoff shaft to satisfy the rotational speed request from the generator;
varying a power output of the generator unit as a function of the rotational speed of the power takeoff shaft;
wherein transmitting a rotational speed request from the generator to the vehicle comprises:
transmitting a request to increase the rotational speed of the power takeoff shaft when the power requirement of the electrical consumer is greater than the available power output; and
transmitting a request to decrease the rotational speed of the power takeoff shaft when the power requirement of the electrical consumer is less than the available power output.

10. The method of claim 9, wherein varying a power output of the generator unit comprises:
adjusting an input rotational speed to the generator unit in order to vary the power output of the generator unit; and
adjusting the rotational speed of the power takeoff shaft to adjust the input rotational speed to the generator unit.

11. The method of claim 9, wherein transmitting the power requirement of the electrical consumer to the generator unit comprises:
transmitting the power requirement of the electrical consumer from the electrical consumer to the vehicle; and
transmitting the power requirement of the electrical consumer from the vehicle to the generator unit.

12. The method of claim 9, wherein the generator unit is externally mounted to the front of the vehicle.

* * * * *